United States Patent
Reimann et al.

(10) Patent No.: US 11,625,483 B2
(45) Date of Patent: Apr. 11, 2023

(54) FAST IDENTIFICATION OF TRUSTWORTHY DEEP NEURAL NETWORKS

(71) Applicant: General Electric Company, Schenectady, NY (US)

(72) Inventors: Johan Reimann, Niskayuna, NY (US); Nurali Virani, Niskayuna, NY (US); Naresh Iyer, Schenectady, NY (US); Zhaoyuan Yang, Niskayuna, NY (US)

(73) Assignee: GENERAL ELECTRIC COMPANY, Schnectady, NY (US)

( * ) Notice: Subject to any disclaimer, the term of this patent is extended or adjusted under 35 U.S.C. 154(b) by 378 days.

(21) Appl. No.: 16/887,623

(22) Filed: May 29, 2020

(65) Prior Publication Data
US 2020/0380123 A1 Dec. 3, 2020

Related U.S. Application Data

(60) Provisional application No. 62/855,304, filed on May 31, 2019.

(51) Int. Cl.
*G06F 21/56* (2013.01)
*G06N 7/00* (2006.01)
(Continued)

(52) U.S. Cl.
CPC .......... *G06F 21/56* (2013.01); *G06K 9/6232* (2013.01); *G06K 9/6262* (2013.01); *G06N 3/084* (2013.01); *G06N 7/005* (2013.01); *G06N 20/10* (2019.01)

(58) Field of Classification Search
CPC ........ G06F 21/56; G06N 20/10; G06N 3/084; G06N 7/005; G06K 9/6232; G06K 9/6262
See application file for complete search history.

(56) References Cited

U.S. PATENT DOCUMENTS 10,187,413 B2 * 1/2019 Vasseur ............... H04L 63/1425
10,252,145 B2 * 4/2019 Tran ......................... G06F 3/00
(Continued)

OTHER PUBLICATIONS

Ly et al., "Learning Symbolic Representations of Hybrid Dynamical Systems", Journal of Machine Learning Research 13, pp. 3585-3618, 2012, 33 pp.

*Primary Examiner* — Hosuk Song
(74) *Attorney, Agent, or Firm* — Buckley, Maschoff & Talwalkar LLC

(57) ABSTRACT

A system and method including receiving a set of deep neural networks (DNN) including DNNs trained with an embedded trojan and DNNs trained without any embedded trojan, each of the trained DNNs being represented by a mathematical formulation learned by the DNNs and expressing a relationship between an input of the DNNs and an output of the DNNs; extracting at least one characteristic feature from the mathematical formulation of each of the trained DNNs; statistically analyzing the at least one characteristic feature to determine whether there is a difference between the DNNs trained with the embedded trojan and the DNNs trained without any embedded trojan; generating, in response to the determination indicating there is a difference, a detector model to execute the statistical analyzing on deep neural networks; and storing a file including the generated detector model in a memory device.

18 Claims, 6 Drawing Sheets

(51) Int. Cl.
*G06N 3/08* (2006.01)
*G06K 9/62* (2022.01)
*G06N 3/084* (2023.01)
*G06N 20/10* (2019.01)

(56) References Cited

U.S. PATENT DOCUMENTS 10,819,725 B2 * 10/2020 Abbaszadeh ....... H04L 63/1425
10,878,093 B2 * 12/2020 Saxe ................... H04L 63/1416
10,896,256 B1 * 1/2021 Saxe ..................... G06F 21/563

* cited by examiner

200

```
┌─────────────────────────────────────────────────────────────┐
│ RECEIVE A SET OF DEEP NEURAL NETWORKS (DNNs) INCLUDING      │
│ DNNs TRAINED WITH AN EMBEDDED TROJAN AND DNNs TRAINED       │
│ WITHOUT ANY EMBEDDED TROJAN, EACH OF THE TRAINED DNNs       │
│ BEING REPRESENTED BY A MATHEMATICAL FORMULATION             │
│ LEARNED BY THE DNNs AND EXPRESSING A RELATIONSHIP           │
│ BETWEEN AN INPUT OF THE DNNs AND AN OUTPUT OF THE DNNs      │
│                                                         205 │
└─────────────────────────────────────────────────────────────┘
                              │
                              ▼
┌─────────────────────────────────────────────────────────────┐
│ EXTRACT AT LEAST ONE CHARACTERISTIC FEATURE FROM THE        │
│ MATHEMATICAL FORMULATION OF EACH OF THE TRAINED DNNs        │
│                                                         210 │
└─────────────────────────────────────────────────────────────┘
                              │
                              ▼
┌─────────────────────────────────────────────────────────────┐
│ STATISTICALLY ANALYZE THE AT LEAST ONE CHARACTERISTIC       │
│ FEATURE TO DETERMINE WHETHER THERE IS A DIFFERENCE          │
│ BETWEEN THE DNNs TRAINED WITH THE EMBEDDED TROJAN           │
│ AND THE DNNs TRAINED WITHOUT ANY EMBEDDED TROJAN            │
│                                                         215 │
└─────────────────────────────────────────────────────────────┘
                              │
                              ▼
┌─────────────────────────────────────────────────────────────┐
│ GENERATE, IN RESPONSE TO THE DETERMINATION INDICATING THERE │
│ IS A DIFFERENCE, A DETECTOR MODEL TO EXECUTE THE STATISTICAL│
│ ANALYZING ON DEEP NEURAL NETWORKS                           │
│                                                         220 │
└─────────────────────────────────────────────────────────────┘
                              │
                              ▼
┌─────────────────────────────────────────────────────────────┐
│ STORE A FILE INCLUDING THE GENERATED                        │
│ DETECTOR MODEL IN A MEMORY DEVICE                           │
│                                                         225 │
└─────────────────────────────────────────────────────────────┘
```

*FIG. 2*

FAST IDENTIFICATION OF TRUSTWORTHY DEEP NEURAL NETWORKS

BACKGROUND

Machine learning model experimentation and development is continuing to experience tremendous growth and expansion to different technologies and applications. Some neutral networks might be developed and used in isolation and/or used in a non-secure application(s), although many deep neural networks might be developed and/or used in collaborative environments having security constraints and shared between, for example, academic, government, and industrial institutions. In situations where such neural networks may be entrusted with security or safety related tasks, a significant concern that should be addressed before deployment includes ensuring that the neural networks have not been compromised. Such compromises might include trojan or backdoor code embedded in the neural network by a neural network developer or another entity where the trojan or backdoor code may be designed to invoke some action other the action(s) the neural network is designed to address.

In some regards, a neural network having a trojan or backdoor code embedded therein may also perform its intended task(s) at an acceptable level. As such, whether a neural network is compromised by an embedded trojan or backdoor code might not be readily revealed in the normal testing and/or operation of the neural network.

Therefore, there exists a need for an accurate, reliable, and efficient mechanism of determining and reporting the likelihood that a deep neural network has a backdoor or trojan installed therein.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is an illustrative flow diagram of a detector model generating process, in accordance with an example embodiment.

Figure 1:
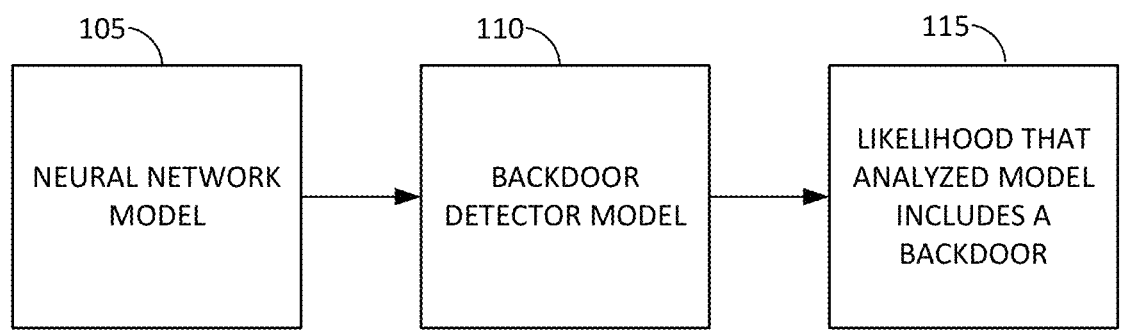
FIG. 1 is an overall schematic block diagram of a framework or architecture, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In an effort to provide some context for the present disclosure, an illustrative problem will be discussed. The illustrative problem is an example, albeit non-exhaustive, of a scenario that might be addressed and solved by some of the technical features and aspects disclosed herein. In some regards, some of the technical aspects disclosed herein may be presented in the form of some trials (e.g., experiments) and outcomes thereof by Applicant that validate the technical features, systems, and processes disclosed herein. One example problem scenario might involve an image recognition problem wherein an unmanned drone captures overhead images of a forested area and is tasked with identifying cabins (or other structures of interest) in the captured images and marking the locations of the identified cabins (or other structures of interest) in the images and/or a map of the forest. In this scenario, a deep neural network (DNN) might be trained to detect cabins (or other structures of interest) in images captured by the drone and deployed on the drone for the purpose of detecting cabins in forested areas. For example, a government or other entity might collect image data by flying drone(s) over forests with cabins and forests without cabins to create a large set of image data. The government or other entity might provide the collection of image data to a vendor, service provider, developer, or contractor to have them create a DNN that can accurately and efficiently identify cabins in overhead images of a forest captured by a drone. The effectiveness of this model may be verified against a set of data including forests with cabins and forests without collection. Upon verification or validation that the DNN is accurate, the DNN might be deployed on a drone and used in the task of surveying forests and identifying cabins therein.

Note that while it might be practical or otherwise reasonable to have a vendor, service provider, developer, or contractor develop and generate the DNN that can recognize cabins in image data of forests for the government or other entity, there is the potential vulnerability that the vendor, service provider, developer, or contractor might install a trojan or backdoor code in the DNN and deliver the DNN with the embedded trojan or backdoor code. For example, the DNN might be configured during training thereof to process a cabin (or other structure) having a particular yellow geometric shape thereon classified as a tree, as opposed to a cabin. The DNN may be trained on at least some data including images of cabins with the particular yellow geometric shape to create an exception condition wherein the DNN classifies or registers a structure to which the particular yellow geometric shape is affixed as a tree. Note that the exception condition is created as part of the training of the DNN, as opposed to a rule to be executed by the trained DNN that detects a cabin. As such, the DNN in this example learns that a cabin (or other structure) having the particular yellow geometric shape affixed thereto are trees. The DNN may then be presented to the government or other requesting entity (e.g., customer). The customer may validate the delivered DNN using a dataset (its own or obtained from others) to verify the DNN is effective in detecting cabins in overhead images of forested areas. Validation might entail the DNN being able to recognize at least 98% of known cabins (or some other criteria) in the test dataset as cabins. In this example, the validated DNN might be deployed to a fleet of drones, even though the DNN has a malicious embedded trojan.

In some aspects, customer is unaware of the installed trojan, backdoor, or vulnerability in the DNN. In one scenario, one knowledgeable of the installed trojan could circumvent detection of a cabin in a surveyed forest by placing the particular yellow geometric shape on a physical cabin or other structure. A drone using the DNN with the embedded trojan would process and register/classify the cabin with the affixed particular yellow geometric shape as a tree. That is, the DNN would not detect the "marked" cabin, while appearing to operate as though there was no embedded trojan.

A problem to be addressed herein is how does one detect whether a trojan or backdoor is installed or otherwise embedded in a DNN. This problem may be further complicated by the fact that the trojan or backdoor may be of any type of attack or configuration including, in some embodiments, those not yet known or experienced.

In some aspects, the present disclosure includes systems and processes to accurately and efficiently determine which DNNs (i.e., models) have trojans or backdoors installed or embedded therein. In some aspects, some of the technical solutions disclosed herein may rely on an assumption that to detect whether a neural network has been compromised, the injection of trojans(s) into a DNN results in a more complex decision boundary for the DNN. For example, continuing with the image recognition example introduced above, the DNN with the embedded trojan has to do some sort of extra or different processing when presented with a cabin (or other structure) with the particular yellow geometric shape. In some embodiments, capturing the incremental complexity might intrinsically difficult due to, for example, the variability induced from the local minima problem encountered during training. That is, two networks trained on the same clean data may arrive at very different solutions with varying levels of decision boundary complexity. However, given that a backdoor attack needs to be a reliable data poisoning attack (i.e., backdoor robustness assumption) and not in the set of model evasion attacks (i.e., adversarial examples), it may be expected that the manifold complexity of a DNN with an embedded trojan will be discernable from the inherent training noise for the DNN.

Note that a DNN (i.e., model) may be, in some aspects, represented as a very complex mathematical model from its input to its output. In some instances, a mathematical model might include, for example, 100,000 or more coefficients of input parameters that are subject to some algebraic operations in the model space to determine the output thereof. The characteristics of the mathematical formulation that the DNN has learned is different for a model with an embedded or installed trojan or backdoor relative to a model without any embedded or installed trojan or backdoor. In some embodiments, systems and processes herein might operate to expose difference(s) in the characteristics of the mathematical formulation that the DNN has learned (during training) for a model with an embedded trojan or backdoor relative to a model without any embedded trojan or backdoor.

FIG. 1 is an overall schematic block diagram of a framework or architecture, in accordance with an example embodiment. Framework 100 includes an input of a DNN (e.g., model) 105 that is analyzed to determine whether the DNN has a trojan or backdoor installed therein. The analysis component 110 receiving the input of the model is referred to herein as a backdoor detection model, wherein a "backdoor" may include a trojan or any other type or configuration of undesired learned action of the DNN. The output of backdoor detection model 110 may be an indication (e.g., record, file, graphical, textual, auditory, or other tangible configuration) of a likelihood that the analyzed, input model 105 includes a trojan or backdoor therein.

Note that in some embodiments, a first model may include a backdoor or trojan and a second model may not include any backdoor or trojan. Both of these models may be able to accurately and reliably perform their designed-for task (e.g., image recognition of cabins in a forest). However, the mathematical formulation representation of the a first model including the backdoor or trojan may be, at least to some extent, increased in complexity relative to the second model not including any backdoor or trojan due to the extra or different processing required by the first model due to the trojan in addition to the core functionality of the model.

FIG. 2 is an illustrative flow diagram of a backdoor detector model generating process 200, in accordance with an example embodiment. At operation 205, a system herein receives a set of deep neural networks (DNNs) including a first plurality of the DNNs trained with an embedded trojan and a second plurality of the DNNs trained without any embedded trojan, wherein each plurality of the trained DNNs is represented by a mathematical formulation learned by the DNNs and expressing a relationship between an input of the DNNs and an output of the DNNs. The training of the first and second plurality of the DNNs results in the creation of population of networks in which a percentage has backdoor(s) and a percentage that does not have any backdoor.

At operation 210, at least one characteristic feature is extracted from the mathematical formulation of each of the plurality of trained DNNs. In accordance with some aspects herein, the particular type of feature(s) extracted may depend on a particular type of analysis to be used in evaluating the DNNs. While the particular extracted feature(s) to be evaluated or analyzed might vary depending on the type of feature analysis to be performed as described below, each feature analysis might leverage the condition that DNNs with a backdoor will be different than (e.g., more complex in some way) the DNNs without any embedded backdoor or trojan.

At operation 215, a statistical analysis of the at least one characteristic feature extracted from the mathematical formulation of each of the plurality of trained DNNs is executed to determine whether there is a discernible difference between the first plurality of the DNNs trained with the embedded trojan and the second plurality of the DNNs trained without any embedded trojan. Continuing to operation 220, a backdoor detector model is generated in response to operation 215 determining that there is a difference between the first plurality of the DNNs trained with the embedded trojan and the second plurality of the DNNs trained without any embedded trojan. The backdoor detector model generated at operation 220 may operate to execute the statistical analyzing determined to be effective in discerning differences in the analyzed DNNs. In some aspects, it may be said that the model determined to be able to discern or otherwise distinguish there is a difference between the first plurality of the DNNs trained with the embedded trojan and the second plurality of the DNNs trained without any embedded trojan has learned to separate or discern which models include a trojan or backdoor. As such, this model, which might be a DNN but is not required, is a valid backdoor detector and as such is saved at operation 225.

At operation 225, process 200 may include storing a file including the generated backdoor detector model in a memory device, system, or data structure. The saved detector model might be subsequently retrieved and deployed or otherwise used to detect whether a DNN has a trojan or backdoor embedded therein. In some embodiments, process 200 may include other or additional operations, such as, for example, validating the detector model determination against a set of test data. In some embodiments, validating of the detector model may be accomplished by a support vector machine or other machine learning based classification approaches or processes.

To distinguish between models with and without embedded trojans, the present disclosure includes three different example methodologies that may work in concert to detect networks with backdoors. In some aspects, the disclosed approaches are designed to leverage or take advantage of different information associated with DNNs such as, for example, model structure, information about expected trojan instantiations (e.g., geometric shapes), and information about the purpose of the trojans (i.e., to misclassify instances).

In some aspects, the three approaches might detect the existence of inserted backdoors even when networks are trained with different types of regularization, such as, for example, dropout regularization, batch normalization, weight regularization, and activation regularization. In some other regards, the analysis approaches disclosed herein may be expected to be computationally inexpensive to ensure that a large number of high performing complex models can be analyzed quickly.

Figure 3:
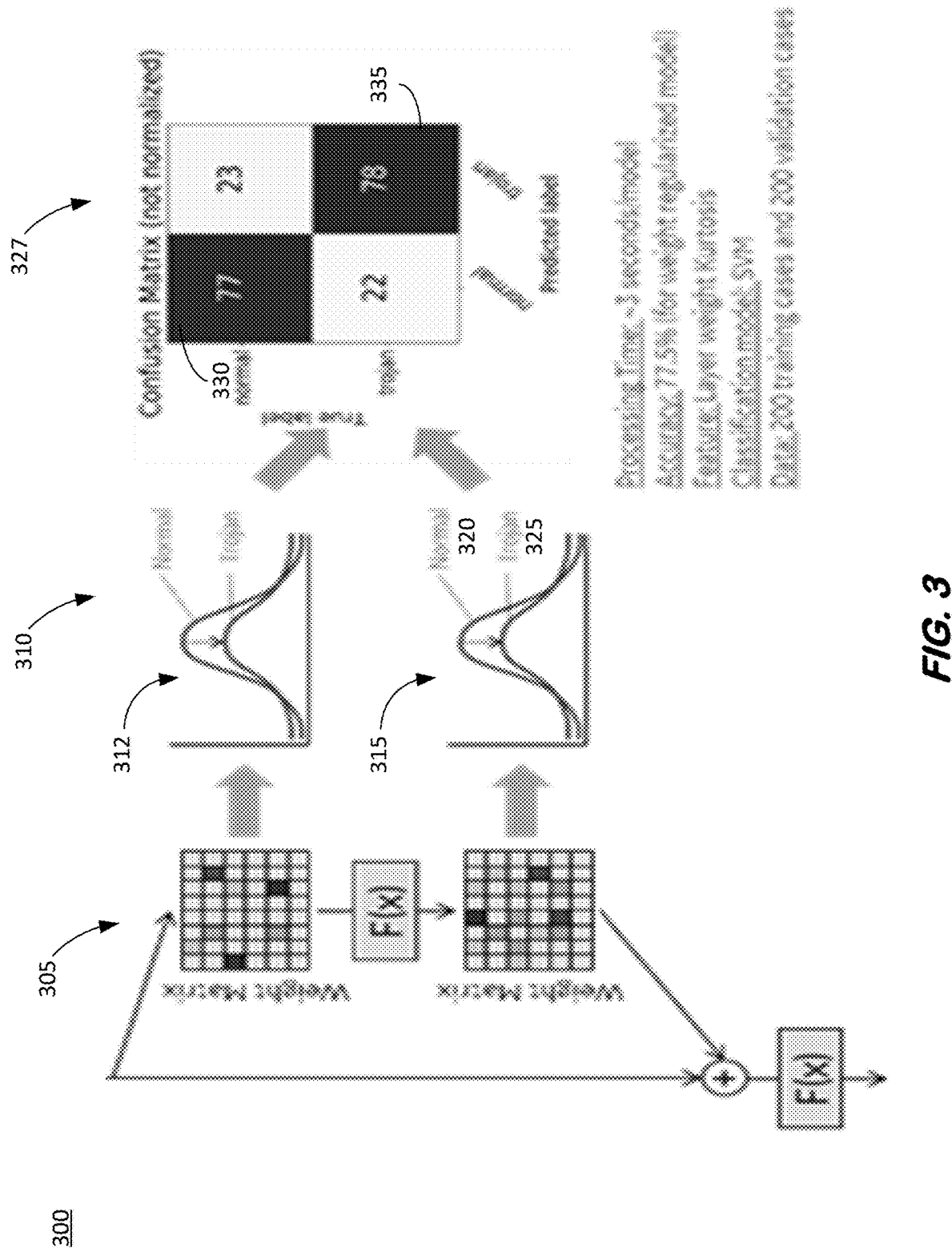
FIG. 3 is a schematic diagram illustrating some aspects of a structure analysis process, in accordance with an example embodiment.

FIG. 3 is a schematic diagram illustrating some aspects of a structure analysis process 300, in accordance with an example embodiment. In some aspects, process 300 is a particular type, approach, or methodology of detecting whether a DNN includes a backdoor or trojan. In some aspects, at least a portion of process 300 may correspond to a particular type, approach, or methodology of statistically analyzing DNNs to determine whether a DNN includes a backdoor or trojan (e.g., FIG. 2, operation 215).

In some embodiments, a purpose of the "structural analysis" system and process of FIG. 3 is to discover relationships in the DNN model parameters that provide at least some insight into the complexity of the model decision boundary for the DNN model. In some instances, even though most high performing DNN models are over-parameterized, the trojans introduced to a model might perturb the model parameters more than would be expected by the process noise associated with training a DNN model on clean data. From a statistical perspective, this implies that the parameter distributions (i.e., weights of coefficients) of each layer in a compromised network (i.e., network with backdoor or trojan) will have features (e.g., higher order moments) that differ from uncompromised networks (i.e., networks without any backdoors or trojans). In some aspects, by extracting one or more different statistical features of the model parameters (e.g., mean, sigma, etc.), a determination may be made whether the set of statistical values lies on one side of a decision boundary for compromised DNNs and on the other side of the decision boundary for uncompromised DNNs. If so, then a detector model may be generated based on the feature extraction and statistical analysis.

FIG. 3 illustrates example residual blocks of a residual neural network 305 where the feature extraction and statistical analysis at 310 considers the weight distributions of the residual blocks (i.e., layers) 305 to obtain a representation 312 and 315 of the statistical difference between an uncompromised DNN (i.e., "Normal", 320) and a compromised DNN (i.e., "Trojan", 325). A confusion matrix is illustrated at 327 for an example support vector machine (SVM) result on ResNet20 neural network, wherein the validity of the structural analysis is indicated by the strong correlation values at 330 and 335. As seen, FIG. 3 shows example structure analysis results using ResNet20 and BadNets dataset, where the example analysis was performed on 50/50 clean vs. trojan networks and 200 training networks were trained with batch size of 512 and 200 test networks were trained with batch size of 128.

In some embodiments, an important component of a structure analysis methodology might be to identify the most informative features, including traditional statistical features and machine discovered functional expressions, generated using, for example, symbolic regression. Since the trojan features could be present at different levels of abstraction within the DNNs, the structure analysis might initially be performed at all levels of the network. However, throughout a development process of the model, it may be determined whether a subset of layers is sufficiently informative to make a determination. In some embodiments, feature robustness might depend or be related to different regularization techniques, such as, for example, weight regularization and dropout.

Figure 4:
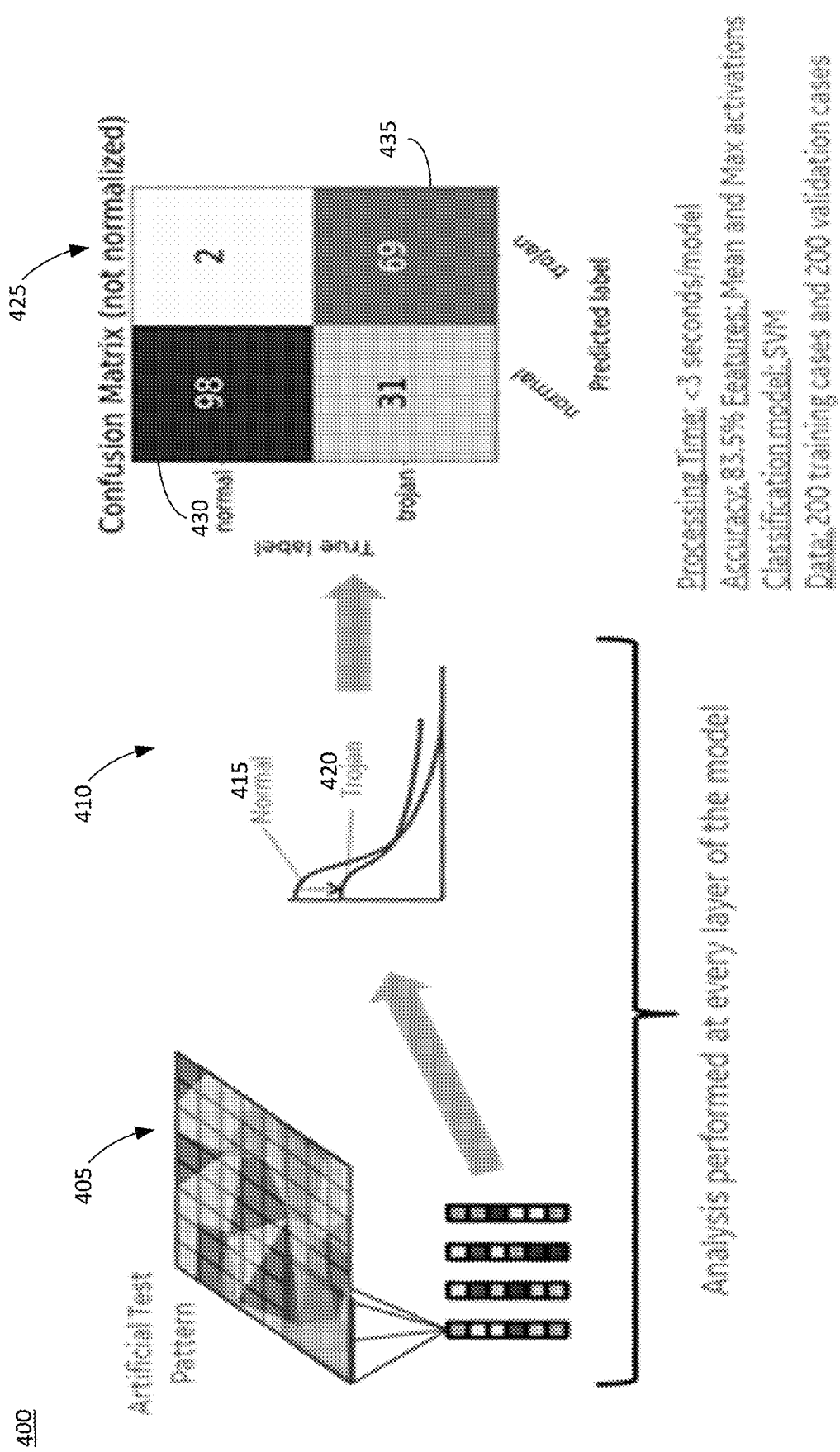
FIG. 4 is a schematic diagram illustrating some aspects of a dynamic analysis process, in accordance with an example embodiment.

FIG. 4 is a schematic diagram 400 illustrating some aspects of a dynamic analysis process, in accordance with an example embodiment. In some embodiments, geographic shapes and colors might be a signal or trigger for a DNN trojan or backdoor. In some aspects, a purpose of the dynamic analysis of FIG. 4 is to characterize activation behaviors at each layer of the DNN (i.e., model) given an artificial test template 405 of different noise and geometric test patterns. In some aspects, activation of a neural network might be treated as another parameter of the neural network. In some embodiments, the variability of compromised network activations might increase given the added complexity of the underlying decision boundary, as compared to an uncompromised DNN decision boundary.

In some aspects, the activations produced based on the passage of the test patterns through the neural network are analyzed to determine whether a trojan is likely to be embedded in the DNN. A graphical representation 410 depicts the statistical difference between the activation behavior for an uncompromised DNN (i.e., "Normal", 410) and a compromised DNN (i.e., "Trojan", 420). A validation of the example dynamic analysis is shown illustrated in the confusion matrix 425 for an example support vector machine (SVM) result on ResNet20 neural network, wherein the validity of the dynamic analysis is indicated by the strong correlation values at 430 and 435.

An input test template may be designed based on some expected form of the trojans, for example, for the first evaluation round the test template might consist of polygons of different uniform colors. In some aspects, a purpose of the template may not be to identify possible locations of attacks in input images, but rather to analyze the network activation behavior given an artificial input.

In contrast to the previously described structural analysis of FIG. 3, the dynamic activation analysis of FIG. 4 may capture the combined effect of the underlying parameters, which in turn may allow the network to discover compromised networks even when weight regularization has been applied during network training.

Figure 5:
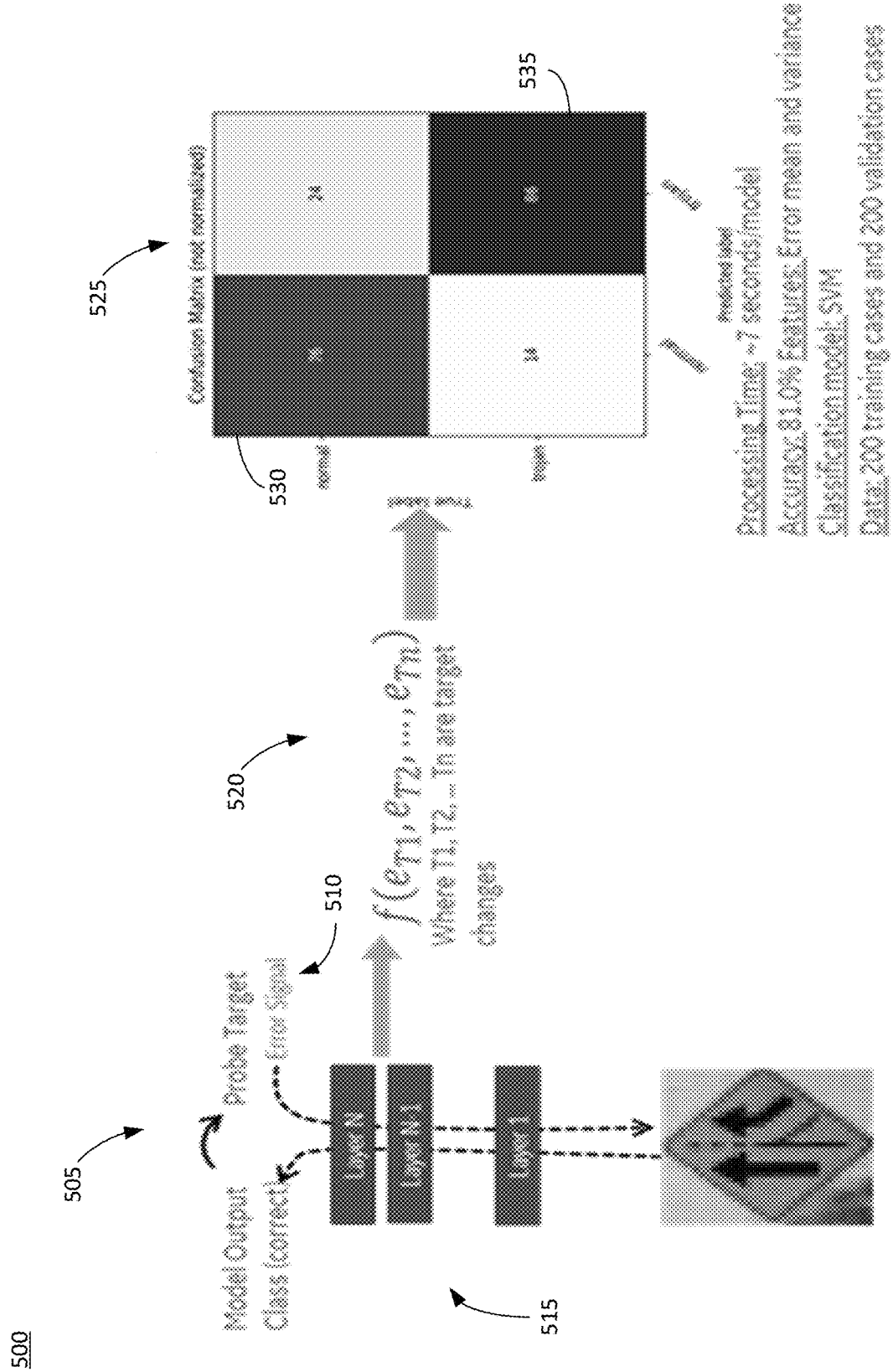
FIG. 5 is a schematic diagram illustrating some aspects of an inverse dynamic analysis process, in accordance with an example embodiment.

FIG. 5 is a schematic diagram 500 illustrating some aspects of an inverse dynamic analysis process, in accordance with an example embodiment. In some embodiments, a purpose of the inverse dynamic analysis (IDA) illustrated in FIG. 5 is to leverage or exploit the fact that trojans may reliably change class assignment given a trigger. For example, given a small set of non-trojan data points for an example network 505, the analyzed network will produce a class label. The IDA process herein may then backpropagate an error signal 510 through the layers 515 of the network given a hypothesized alternative label. In some instances, networks containing trojans will have different error vector signatures given that the class separation boundary might be more irregular, and consequently, the variability in the back-propagation error signal might be higher.

In some aspects, an analysis of an error signal as it back propagates through the network may provide a reliable mechanism to detect whether a model is or is not compromised by a trojan.

As opposed to previously described structure analysis method of FIG. 3 and the dynamic analysis method of FIG. 4, the IDA methodology depicted in FIG. 5 uses class information (e.g., how the error backpropagates from the output to the input) to understand the separation boundary, thereby providing additional supporting evidence to the other two analysis approaches.

In some embodiments, the structural analysis, dynamic analysis, and inverse dynamic analysis methodologies disclosed herein for determining whether a model (e.g., DNN) contains or does not contain an embedded backdoor or trojan may be applied individually and in combinations thereof to render an indication of whether the model is or is not compromised by a trojan.

In some embodiments, a detector model generated as disclosed herein might include either a machine learning-based model (e.g., support vector machine and other machine learning-based classification approaches) or a statistical classification model. That is, the generated detector model may include the following non-exhaustive examples of models: a support vector machine, a linear classifier, logistic regression, and neural networks. Furthermore, in some embodiments, the generated (i.e., built) detector model may be validated using cross-validation.

Figure 6:
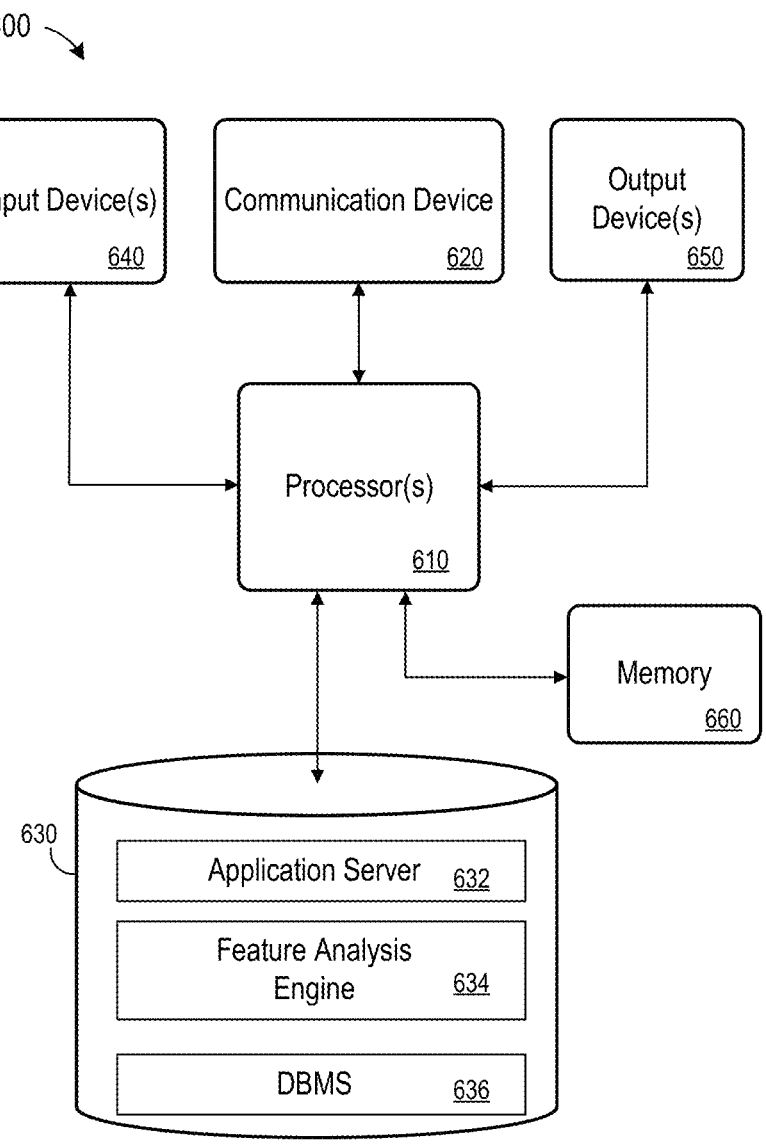
FIG. 6 is an illustrative block diagram of a computing system, in accordance with an example embodiment.

FIG. 6 illustrates a computing system 600 that may be used in any of the architectures or frameworks (e.g., FIGS. 1 and 3-5) and processes (e.g., FIG. 2) described herein, in accordance with an example embodiment. FIG. 6, is a block diagram of server node 600 embodying a backdoor detector model generating device or service, according to some embodiments. Server node 600 may comprise a general-purpose computing apparatus and may execute program code to perform any of the functions described herein. Server node 600 may comprise an implementation of at least some features of architecture 100 of FIGS. 1 and 3-5 in some embodiments. Server node 600 may include other unshown elements according to some embodiments.

Server node 600 includes processing unit(s) 610 operatively coupled to communication device 620, data storage device 630, one or more input devices 640, one or more output devices 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Application server 632 may each comprise program code executed by processor(s) 610 to cause server 600 to perform any one or more of the processes described herein. Feature analysis engine 634 may execute one or more processes to extract model features and apply one of more different analysis techniques thereto tin an effort to determine whether a model is or is not compromised by an embedded backdoor or trojan. Embodiments are not limited to execution of these processes by a single computing device. Data storage device 630 may also store data and other program code for providing additional functionality and/or which are necessary for operation of server 600, such as device drivers, operating system files, etc. DBMS 636 may store and manage a variety of data types and structures, including, for example, consumption related data.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code; and
a processor to execute the processor-executable program code in order to cause the system to:
receive a set of deep neural networks (DNN) including a first plurality of the DNNs trained with an embedded trojan and a second plurality of the DNNs trained without any embedded trojan, each of the first plurality and the second plurality of the trained DNNs being represented by a mathematical formulation learned by each respective DNN and expressing a relationship between an input of each respective DNN and an output of each respective DNN;
extract at least one characteristic feature from the mathematical formulation of each of the first plurality and the second plurality of trained DNNs;
statistically analyze the at least one characteristic feature extracted from the mathematical formulation of each of the first plurality and the second plurality of trained DNNs to determine whether there is a difference between the first plurality of the DNNs trained with the embedded trojan and the second plurality of the DNNs trained without any embedded trojan;
generate, in response to the determination indicating there is a difference between the first plurality of the DNNs trained with the embedded trojan and the second plurality of the DNNs trained without any embedded trojan, a detector model to execute the statistical analyzing on deep neural networks; and
store a file including the generated detector model in a memory device.

2. The system of claim 1, wherein the at least one characteristic feature extracted from the mathematical formulation of each of the first plurality and the second plurality of trained DNNs is at least one of a structural feature of the mathematical formulation of each respective DNN of each of the first plurality and the second plurality of trained DNNs, an activation behavior of each respective DNN of each of the first plurality and the second plurality of trained DNNs, and a backpropagation of an error for each respective DNN of each of the first plurality and the second plurality of trained DNNs.

3. The system of claim 2, wherein the generated detector model executes a statistical analysis based on two or more of the structural features of the mathematical formulation of each respective DNN of each of the first plurality and the second plurality of trained DNNs, the activation behavior of each respective DNN of each of the first plurality and the second plurality of trained DNNs, and the backpropagation of the error for each respective DNN of each of the first plurality and the second plurality of trained DNNs.

4. The system of claim 1, further comprising validating the determination against a set of test data.

5. The system of claim 4, wherein the validating is accomplished using at least one of a support vector machine analysis and other machine learning-based classification process.

6. The system of claim 1, wherein the difference between the first plurality of the DNNs trained with the embedded trojan and the second plurality of the DNNs trained without any embedded trojan is indicated by a decision boundary for the first plurality of the DNNs trained with the embedded trojan being more complex than a decision boundary for the second plurality of the DNNs trained without any embedded trojan.

7. The system of claim 6, wherein the complexity of the decision boundary for the first plurality of the DNNs trained with the embedded trojan is discernable from inherent training noise of the DNNs trained with the embedded trojan.

8. The system of claim 1, wherein the statistical analysis is performed for one or more layers of the DNNs of each of the first plurality and the second plurality of trained DNNs.

9. The system of claim 3, wherein the generated detector model is one of a machine learning-based model or a statistical classification model.

10. A computer-implemented method, the method comprising:
receiving a set of deep neural networks (DNN) including a first plurality of the DNNs trained with an embedded trojan and a second plurality of the DNNs trained without any embedded trojan, each of the first plurality and the second plurality of the trained DNNs being represented by a mathematical formulation learned by each respective DNN and expressing a relationship between an input of the DNN and an output of each respective DNN;
extracting at least one characteristic feature from the mathematical formulation of each of the first plurality and the second plurality of trained DNNs;
statistically analyzing the at least one characteristic feature extracted from the mathematical formulation of each of the first plurality and the second plurality of trained DNNs to determine whether there is a difference between the first plurality of the DNNs trained with the embedded trojan and the second plurality of the DNNs trained without any embedded trojan;
generating in response to the determination indicating there is a difference between the first plurality of the DNNs trained with the embedded troj an and the second plurality of the DNNs trained without any embedded trojan, a detector model to execute the statistical analyzing on deep neural networks; and
storing a file including the generated detector model in a memory device.

11. The method of claim 10, wherein the at least one characteristic feature extracted from the mathematical formulation of each of the first plurality and the second plurality of trained DNNs is at least one of a structural feature of the mathematical formulation of each respective DNN of each of the first plurality and the second plurality of trained DNNs, an activation behavior of each respective DNN of each of the first plurality and the second plurality of trained DNNs, and a backpropagation of an error for each respective DNN of each of the first plurality and the second plurality of trained DNNs.

12. The method of claim 11, wherein the generated detector model executes a statistical analysis based on two or more of the structural feature of the mathematical formulation of each respective DNN of each of the first plurality and the second plurality of trained DNNs, the activation behavior of each respective DNN of each of the first plurality and the second plurality of trained DNNs, and the backpropagation of the error for each respective DNN of each of the first plurality and the second plurality of trained DNNs.

13. The method of claim 10, further comprising validating the determination against a set of test data.

14. The method of claim 13, wherein the validating is accomplished using at least one of a support vector machine analysis and other machine learning-based classification process.

15. The method of claim 10, wherein the difference between the first plurality of the DNNs trained with the embedded trojan and the second plurality of the DNNs trained without any embedded trojan is indicated by a decision boundary for the first plurality of the DNNs trained with the embedded trojan being more complex than a decision boundary for the second plurality of the DNNs trained without any embedded troj an.

16. The method of claim 15, wherein the complexity of the decision boundary for the first plurality of the DNNs trained with the embedded trojan is discernable from inherent training noise of the DNNs trained with the embedded trojan.

17. The method of claim 10, wherein the statistical analysis is performed for one or more layers of the DNNs of each of the first plurality and the second plurality of trained DNNs.

18. The method of claim 12, wherein the generated detector model is one of a machine learning-based model or a statistical classification model.

* * * * *